United States Patent [19]

Kitazawa et al.

[11] Patent Number: 5,733,458
[45] Date of Patent: Mar. 31, 1998

[54] MATERIAL INTERFACE CHANGING METHOD

[75] Inventors: Koichi Kitazawa, Tokyo; Hiroharu Sugawara, Kanagawa; Noriyuki Hirota, Tokyo; Takuro Homma, Kanagawa; Satoshi Maruyama, Tokyo; Shinichi Yamashita, Tokyo; Jun Nakagawa, Tokyo, all of Japan

[73] Assignee: TDK Corporation, Tokyo, Japan

[21] Appl. No.: 621,094

[22] Filed: Mar. 22, 1996

[51] Int. Cl.$^6$ .............................. C02F 1/48; B01D 35/06
[52] U.S. Cl. .................................. 210/69.5; 210/222
[58] Field of Search ................................ 210/222, 223, 210/695

[56] References Cited

PUBLICATIONS

J. Appl. Phys., vol. 75, No. 10, pp. 7177–7179, May 15, 1994, S. Ueno, et al., "Properties of Diamagnetic Fluid in High Gradient Magnetic Fields".

Solid State Physics, vol. 30, No. 2, pp. 146–151, 1996, N. Hirota, et al., "Moses Effect and Reversed Moses Effect".

Primary Examiner—David A. Reifsnyder
Attorney, Agent, or Firm—Oblon, Spivak, McClelland, Maier & Neustadt, P.C.

[57] ABSTRACT

The interface between two nonmagnetic fluids, typically liquid layers, in contact with each other is changed by applying a magnetic field thereto. The interface is raised or depressed into an upward or downward convex shape.

21 Claims, 7 Drawing Sheets

$\rho_B < \rho_{AC}$  $\rho_B > \rho_{AC}$

MATERIAL INTERFACE CHANGING METHOD

BACKGROUND OF THE INVENTION

1. Field of the Invention

This invention relates to a method for changing the interface between materials. More particularly, it relates to a method for changing the position of the interface between two fluids, typically liquids.

2. Prior Art

An interesting phenomenon of water under the impetus of an applied magnetic field is reported in Ueno et al., J. Appl. Phys., 75 (10), 15 May 1994, pp. 7177–7179. When a magnetic field of at least several teslas, for example, about 8 to 10 T is applied to water in a vessel, the surface of water in contact with air is significantly changed in shape such that the water is split at the center and forced toward opposite side walls of the vessel. When a magnetic field of 10 T is applied, for example, the water surface is lowered about 4 cm at the center of the vessel. We call this phenomenon Moses effect. A similar, but reversed phenomenon occurs with an aqueous solution of copper sulfate. The solution is raised at the center. We propose to call it reversed Moses effect. With respect to diamagnetic and paramagnetic materials which are classified into nonmagnetic materials, we found that high magnetic fields of several teslas or more have an influence of changing the shape of their surface comparable to gravity.

In most cases, application of magnetic fields of greater than about 2 T resorts to superconducting magnets. Lower magnetic fields can be produced by electromagnets and permanent magnets such as rare earth magnets. With the recent advance of rare earth magnets, magnetic fields of up to about 1 T are now readily available. It is generally believed that magnetic fields of the order of about 1 to 2 T affect only magnetic materials including ferromagnetic and ferrimagnetic materials. In fact, magnetic fields of about 1 to 2 T have only a little, almost invisible, magnetic influence on the surface of a liquid, that is, an air-liquid interface.

SUMMARY OF THE INVENTION

An object of the present invention is to provide a method for changing the shape of the interface between two materials by applying a magnetic field, which method enables that the change of the interface shape in an amount at least equal to that conventionally observed on the air-liquid interface be achieved by a magnetic field of significantly lower intensity than conventionally used magnetic field intensity.

More specifically, an object of the present invention is to provide a method for changing the interface between two fluids to a significant extent by applying not only a high magnetic field of about several teslas or more, but also a readily available magnetic field of the order of about 1 to 2 T.

According to the present invention, there is provided a method for changing the interface between two nonmagnetic fluids in contact with each other, comprising the step of applying a magnetic field to the fluids for repositioning the interface.

Typically, the nonmagnetic fluids are liquids.

In one preferred embodiment, the step of repositioning the interface includes reshaping or moving the interface.

In one preferred embodiment, the magnetic field has a maximum intensity of up to 10 T, especially 0.1 to 2 T. The magnetic field preferably has a gradient in at least one direction. The magnetic field gradient may be at least 0.001 T/cm.

In one preferred embodiment, the two nonmagnetic fluids meet the following requirements:

$$|\Delta\chi/\Delta\rho|>|\chi_1|hd\ 1/\rho_1 \text{ and } |\Delta\chi/\Delta\rho|>|\chi_2|/\rho_2$$

wherein one fluid has a density $\rho_1$ and a magnetic susceptibility $\chi_1$ and the other fluid has a density $\rho_2$ and a volume magnetic susceptibility $\chi_2$, and $\Delta\rho = \rho_1 - \rho_2$ and $\Delta\chi = \chi_1 - \chi_2$.

Preferably, the step of repositioning the interface includes curving the interface to be convex in a vertically upward or downward direction; the step of repositioning the interface includes surrounding one liquid by the other liquid; the step of repositioning the interface includes dividing one liquid into two parts by the other liquid.

In one preferred embodiment, the method further comprises the step of moving the magnetic field for moving one liquid.

Where the two liquids form upper and lower layers defining the interface therebetween, the step of repositioning the interface can turn the liquid layers up side down or invert the respective liquid layers such that the lower liquid is moved to the upper layer and the upper liquid is move to the lower layer.

Where one liquid is present as a droplet having a diameter in the other liquid, the step of repositioning the interface can control the diameter of the droplet.

In one preferred embodiment wherein one liquid is present as droplets in the other liquid, the step of repositioning the interface is to move the droplets.

In one preferred embodiment wherein a third liquid is disposed between the two liquids in a three layer arrangement, the step of repositioning the interface is to discretely localize the third liquid at the interface between the two liquids. Where the two liquids which are miscible with each other are separated by the third liquid in the three layer arrangement, the magnetic field applied can act to bring the two liquids in mutual contact to form a solution.

In a further preferred embodiment, a layer intervenes between the first and second fluids along the interface. Preferably at least part of the intervening layer changes its shape as the interface is repositioned. The intervening layer is preferably a polymer film or glass fiber web.

The present invention also provides a method for changing an interface in the form of a layer intervening between two adjacent nonmagnetic gases, comprising the step of applying a magnetic field to the gases for repositioning the interface.

When particles of a nonmagnetic solid material are dispersed in a nonmagnetic liquid to define an interface between each particle and the liquid, there is provided a method for changing the interface comprising the step of applying a magnetic field to the dispersion for repositioning the interface.

In another aspect, the present invention provides a material interface changing apparatus comprising a vessel charged with two nonmagnetic fluids which are in contact with each other to define an interface therebetween and means for applying a magnetic field to the fluids for repositioning the interface.

The invention is predicated on our discovery that when a magnetic field is applied to two or more nonmagnetic immiscible liquids, the shape of the liquid-liquid interface can be changed even with a magnetic field intensity as low as about 1 to 2 T. The shape change of the liquid-liquid interface manifests itself in a magnified manner as compared with the shape change of the air-liquid interface. This has never been reported in the literature.

Figure 1:
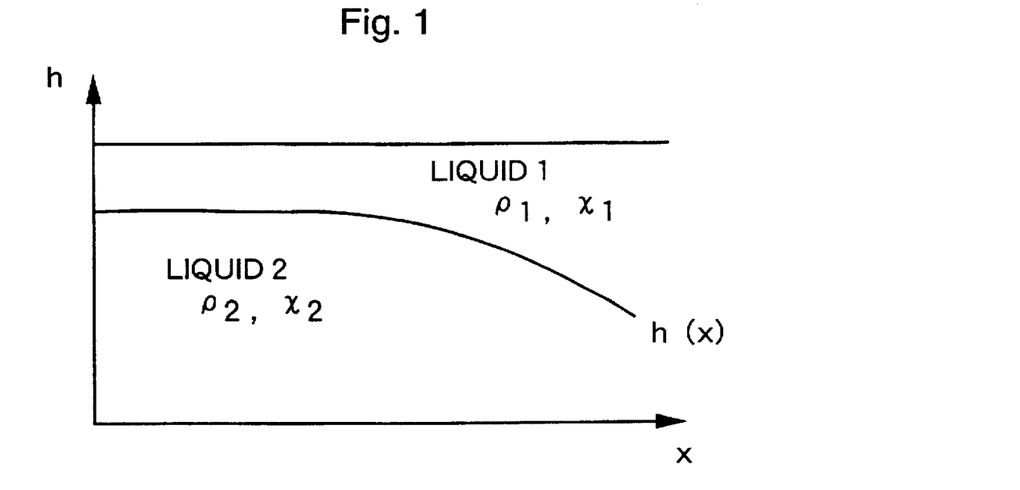
FIG. 1 schematically illustrates the principle of the invention.

Assume that two liquids 1 and 2 form layers in mutual contact. A first liquid 1 has a density $\rho_1$ and a volume magnetic susceptibility $\chi_1$ and a second liquid 2 has a density $\rho_2$ and a volume magnetic susceptibility $\chi_2$. A magnetic field is applied to the layers of liquids 1 and 2 as shown in FIG. 1. The intensity of the magnetic field varies in a horizontal or x axis direction. The magnetic field has an intensity H(x) at a horizontal position x. The intensity of the magnetic field may also vary in a height or h axis direction although it is assumed herein for simplicity's sake that the magnetic field intensity in the h axis direction is independent of the position along the h axis. Since only the intensity of the magnetic field is crucial, the magnetic field may have any orientation.

Provided that h(x) represents the position of the interface between liquids 1 and 2 in a steady state in FIG. 1, the following expression is given in SI units.

Expression I: $\Delta\rho g h(x) = (\tfrac{1}{2})\mu_0 \Delta\chi H(x)^2$ wherein $\Delta\rho = \rho_1 - \rho_2$, $\Delta\chi = \chi_1 - \chi_2$, g is the gravitational acceleration, and $\mu_0$ is the vacuum magnetic permeability. As a consequence, the position of the liquid-liquid interface is altered in accordance with the magnetic field intensity as shown by a curve h(x) in FIG. 1.

Merely applying a magnetic field to a paramagnetic aqueous solution of copper sulfate induces little change in shape of the liquid surface (air-liquid interface) as long as the magnetic field is of the order of 1 T. Nevertheless, when chlorobenzene is added to a copper sulfate aqueous solution to form layers as shown in FIG. 1, the shape of the liquid-liquid interface undergoes a significant change (for example, the interface position changes more than 2 cm) under an applied magnetic field of less than about 1 or 2 T. By substituting a liquid-liquid interface for the air-liquid interface, Moses effect and reversed Moses effect are significantly enhanced.

Such a change of the liquid-liquid interface can be applied in a wide variety of industrial fields including chemical processes handling nonmagnetic liquids, ceramic processes, metallurgical processes, and biological processes. Potential application to medical magnetic treatment and various magnetic treatments is also expected. For example, in a solvent extraction process where the shape of the interface between two liquids such as aqueous and organic solvent phases is important for improved efficiency, the interfacial shape can be controlled by applying a magnetic field. Reaction and crystal growth at the interface between two or more liquids can be controlled by applying a magnetic field to alter the shape of the interface.

BRIEF DESCRIPTION OF THE DRAWINGS

These and further features of the present invention will be apparent with reference to the following description and drawings, wherein.

DETAILED DESCRIPTION OF THE INVENTION

Magnetic field to be applied

Satisfactory changes of the interface position are accomplished with a magnetic field having an intensity of 10 T or less. Magnetic fields having a readily available intensity of up to 2 T, typically up to 1.5 T are still effective. The lower limit of the magnetic field intensity at the center is preferably at least 0.1 T, especially at least 0.2 T. For the applied magnetic field, only its intensity is crucial while its direction is generally not crucial. A static magnetic field is generally used although it is acceptable to move a magnetic field, change magnetic field intensity with time, or rotate a magnet to provide a rotating magnetic field, if necessary. Often a DC magnetic field is used although an alternating magnetic field is acceptable.

The magnetic field should have an intensity distribution or gradient. The magnetic field gradient should preferably be at least 0.001 T/cm, especially at least 0.05 T/cm. The upper limit of the magnetic field gradient is not critical although the maximum gradient is usually about 2 T/cm for a magnetic field of about 1 to 2 T. The magnetic field gradient may be unidirectional, bidirectional or tridirectional. Both the components of a magnetic field in directions horizontal and perpendicular to gravity are effective, and the action of a magnetic field differs depending on whether its direction is horizontal or perpendicular. A resultant magnetic field from both the magnetic field components is also effective. It is also acceptable to move or rotate the magnetic field.

Liquids

At least two liquids are brought in mutual contact to define an interface therebetween. They should not form a homogeneous system at least within a time necessary to induce a change of the interface. Although the two liquids in contact via the interface may be miscible or compatible with each other, they should remain as separate liquid phases within a time necessary to induce a change of the interface. The interface between the two liquids may have a finite thickness as a transition region as long as they do not form a homogeneous system.

Provided that a first liquid has a density $\rho_1$ and a volume magnetic susceptibility $\chi_1$, a second liquid has a density $\rho_2$ and a volume magnetic susceptibility $\chi_2$, and $\Delta\rho = \rho_1 - \rho_2$ and $\Delta\chi = \chi_1 - \chi_2$, it is preferred that $|\Delta\chi/\Delta\rho|$ be greater than $|\chi_1/\rho_1|$ and $|\chi_2/\rho_2|$. In order to enhance an interfacial change, it is preferred that the magnitude of $\Delta\chi$ be maximized and the magnitude of $\Delta\rho$ minimized. In order to produce a significant interfacial change by applying a magnetic field of the order of 0.1 T to 1 or 2 T, it is preferred that $|\Delta\chi/\Delta\rho|$ be at least about $1\times10^{-4}$ cm$^3$g$^{-1}$, especially about $1\times10^{-3}$ to 1 cm$^3$g$^{-1}$. In order for a low magnetic field to be effective, it is preferred that $|\Delta\chi|$ be at least about $1\times10^{-8}$, and more preferably about $1\times10^{-7}$ to $1\times10^{-3}$, most preferably about $1\times10^{-7}$ to $1\times10^{-5}$ and $|\Delta\rho|$ be 0 to about 1 g/cm$^3$, especially 0 to about 0.1 g/cm$^3$.

Diamagnetic liquids with $\chi$ (volume susceptibility) <0 include almost all organic solvents such as hydrocarbons, alcohols, ketones, benzene, and tetrahydrofuran; and inorganic liquids such as water, carbon disulfide, and liquid ammonia. Paramagnetic liquids with $\chi$>0 include solutions containing transition metal ions or transition metal complex molecules as a solute in the above-mentioned diamagnetic liquids and similar solutions containing radicals as a solute.

The magnitude of the volume susceptibility of the liquids used, that is, $|\chi|$ should preferably be up to $1\times10^{-1}$, especially up to $1\times10^{-4}$.

Shape change of layer liquid-liquid interface

1) Raising mode (reversed Moses mode)

Figure 2:
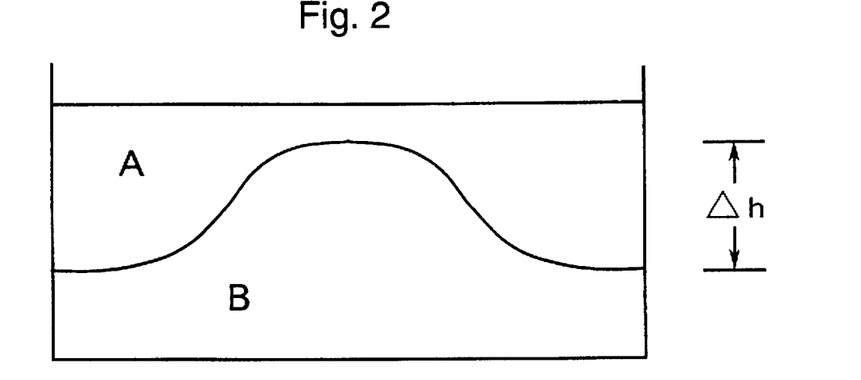
FIGS. 2 to 21 illustrate various embodiments of the invention.
Figure 9:
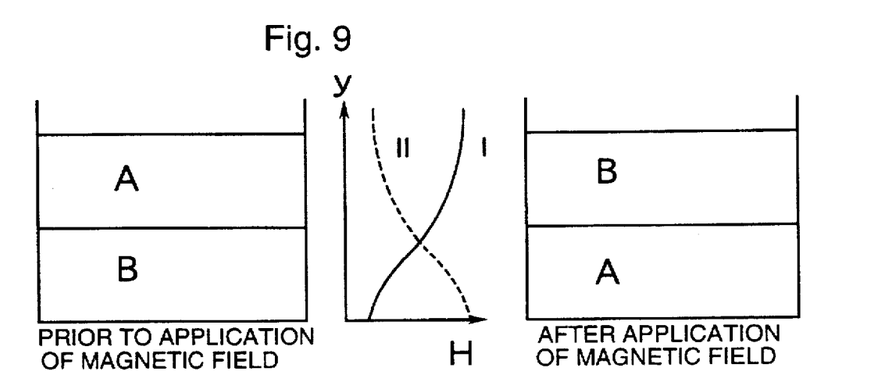

A paramagnetic or diamagnetic liquid A and a paramagnetic or diamagnetic liquid B form upper and lower layers in a vessel (see the left side of FIG. 9). Liquid A has a density $\rho_A$ and a volume magnetic susceptibility $\chi_A$, liquid B has a density $\rho_B$ and a volume magnetic susceptibility $\chi_B$, and $\Delta\rho=\rho_A-\rho_B$ and $\Delta\chi=\chi_A-\chi_B$. Under a set of conditions $\rho_A<\rho_B$ and $\chi_A<\chi_B$, that is, $\Delta\rho<0$ and $\Delta\chi<0$, for example, if a magnetic field having a gradient in a horizontal axis direction is applied such that a maximum magnetic field is exerted at the center of the vessel, then the interface is changed as shown in FIG. 2 in the reversed Moses mode that liquid B is raised upwardly convex at the center (maximum magnetic field site) as viewed in a vertical cross section. For $\Delta\chi>0$, if a magnetic field is applied such that a maximum magnetic field is exerted at opposite ends of the vessel, then the interface is changed in the reversed Moses mode as shown in FIG. 2.

Figure 3:
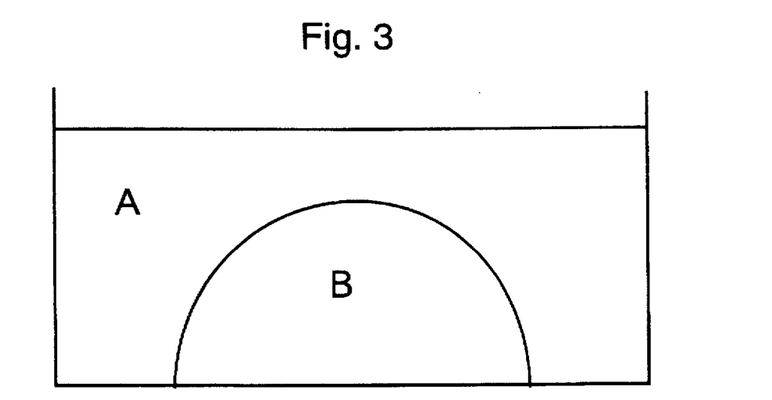
Figure 4:
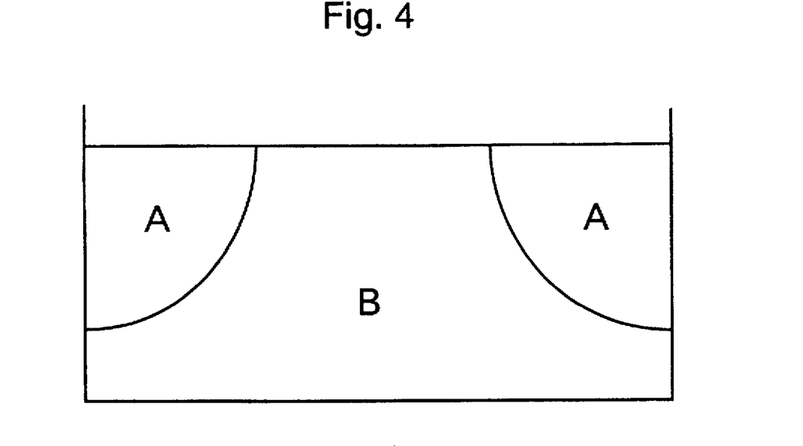

A variety of interfacial changes can be induced by controlling the volume ratio of liquids A and B, $\Delta\rho$ and $\Delta\chi$. For example, the interface is raised and rounded upwardly convex so that the ends of the interface reach the bottom of the vessel whereby liquid A surrounds or confines liquid B to prevent liquid B from contacting the side walls of the vessel as shown in FIG. 3. A center portion of the interface is raised to the air-liquid interface whereby liquid B is exposed at the liquid phase interface to divide liquid A into two parts as shown in FIG. 4. There can also be accomplished an interfacial shape change resultant from a combination of the confinement shown in FIG. 3 and the division shown in FIG. 4, that is, both liquids A and B are in contact with the vessel bottom and air.

2) Depression mode (Moses mode)

Figure 5:
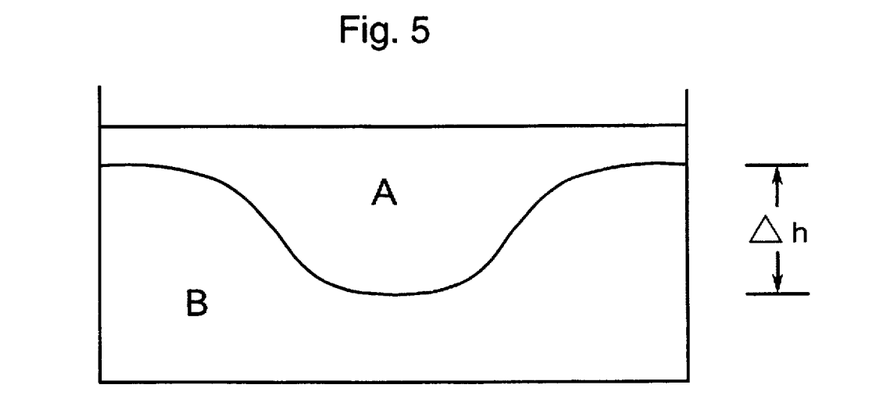

In a layered state of liquids A and B as mentioned above and under a condition $\chi_A>\chi_B$, that is, $\Delta\chi>0$, if a magnetic field having a gradient in a horizontal axis direction is applied such that a maximum magnetic field is exerted at the center of the vessel, then the interface is changed in the Moses mode that liquid B is depressed downwardly convex at the center (maximum magnetic field site) as shown in FIG. 5. For $\Delta\chi<0$, if a magnetic field is applied such that a maximum magnetic field is exerted at opposite ends of the vessel, then the interface is changed in the Moses mode as shown in FIG. 5.

Figure 6:
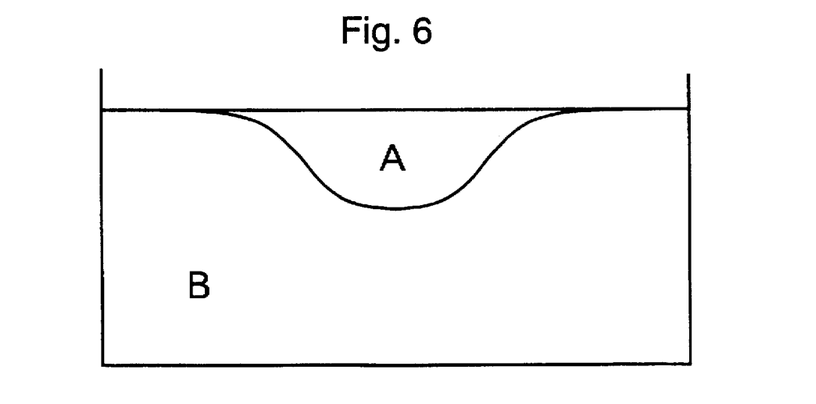
Figure 7:
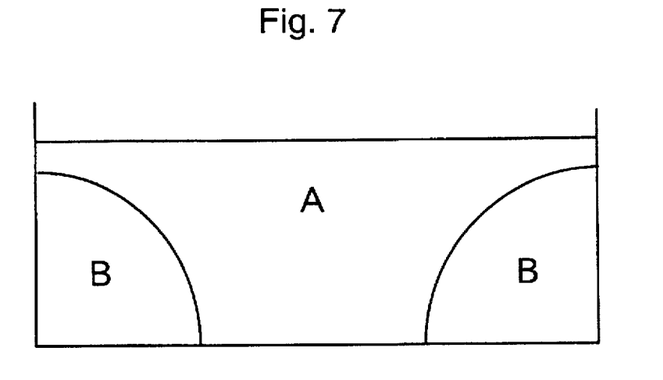
Figure 8:
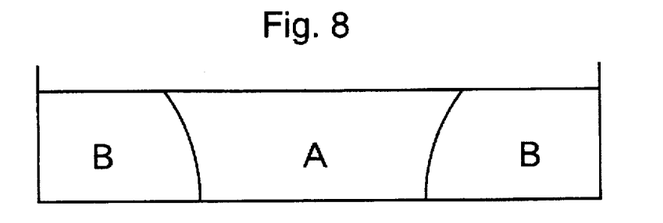

A variety of interfacial changes can also be induced by controlling the volume ratio of liquids A and B, $\Delta\rho$ and $\Delta\chi$. For example, the ends of the interface reach the air-liquid interface whereby liquid B is exposed at the liquid phase interface and surrounds or confines liquid A as shown in FIG. 6. A center portion of the interface is depressed to the bottom of the vessel whereby liquid A reaches the vessel bottom to divide liquid B into two parts as shown in FIG. 7. If the volume of liquid A is reduced, both liquids A and B are exposed at the liquid phase surface and contacted with the vessel bottom as shown in FIG. 8. There can also be accomplished an interfacial shape change resultant from a combination of these changes.

In both raising and depression modes 1) and 2), if the intensity distribution of the magnetic field is varied with time, liquid A or liquid B or both can be moved. Then the desired amount of liquid can be moved to a certain destination or moved back and forth to effect agitation. Alternatively, the interfacial shape can be deformed with time. A change of the interface with time enables that two parts of liquid A which are initially separated in the absence of a magnetic field as shown in FIG. 4 are joined together as shown in FIG. 2; two parts of liquid B which are separated as shown in FIG. 7 are joined together as shown in FIG. 5; inversely, the upper or lower layer of liquid is divided into two parts by the lower or upper layer of liquid. During these changes, exchange of solutes between the liquids is possible. In a system wherein a solid material which is reactive with one liquid is fixedly held in the other liquid, if the magnetic field intensity distribution is varied to move the interface between the two liquids, the one liquid can be controlledly contacted with the solid material. Then the start or stop of reaction of the solid material with the one liquid can be controlled by a magnetic field. The start or stop of reaction can be controlled in a layered system whose interface is to be changed as shown in FIGS. 7 and 8, for example, if a solid material reactive with liquid A as an upper layer is placed at the bottom of the vessel.

The magnetic field having an intensity distribution as mentioned above may be rotated with respect to the liquids. In FIG. 6, the height of the interface of liquid A is changed only in the horizontal axis direction where the magnetic field is graded. If the magnetic field gradient is rotated about a vertical axis at such a rotational speed that motion of liquids cannot follow, liquid A is surrounded by liquid B as if liquid A is a circular pool as viewed from right above. That is, liquid A is maintained at the center without contact with the vessel wall.

When a static magnetic field having a gradient not only in a horizontal direction, but also symmetric with respect to a vertical axis at the center of the vessel is used instead of rotating the magnetic field gradient, liquid A is surrounded by liquid B and collected where the magnetic field distribution is high. As in the case of the rotating magnetic field, liquid A is maintained at the center without contact with the vessel wall.

Movement of layer liquid-liquid interface

At the initial, liquids A and B form upper and lower layers in a vessel as shown on the left side of FIG. 9. By applying a magnetic field having an intensity graded in a height or y axis direction as shown at the middle of FIG. 9, the layers are turned up side down. The liquid B is shifted from the lower layer to an upper layer as shown on the right side of FIG. 9.

The magnetic field intensity H in y axis direction should have a gradient as shown by curve II where $\chi_A>\chi_B$, but curve I where $\chi_A<\chi_B$. A magnetic field intensity H at the interface required to turn the layers of liquids A and B up side down multiplied by a magnetic field gradient dH/dy has a threshold value. That is, the following expression must hold for the interface.

Expression II: $(\chi_A-\chi_B)\mu_0 H(dH/dy)<(\rho_A-\rho_B)g$

Note that both sides of expression II have negative values in these cases. The effect of interfacial tension is neglected herein although it should be taken into account in a strict sense.

Figure 10:
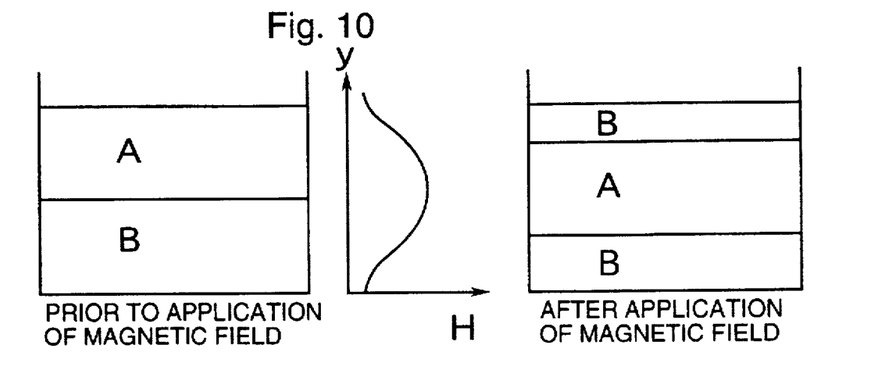

Another movement is shown in FIG. 10. Also liquids A and B form upper and lower layers in a vessel as shown on the left side of FIG. 10. By applying a magnetic field having a gradient in a height direction such that a maximum magnetic field is exerted near the interface between the two liquid layers as shown at the middle of FIG. 10, the layered structure is converted into a structure of layers B-A-B as shown on the right side of FIG. 10. While the B-A-B layered structure has two interfaces, expression II holds for the upper interface. The volumes of upper and lower divided portions of liquid B are determined by expression II in accordance with the volume of liquid A, the total volume of liquid B, and the magnetic field distribution.

Figure 11:
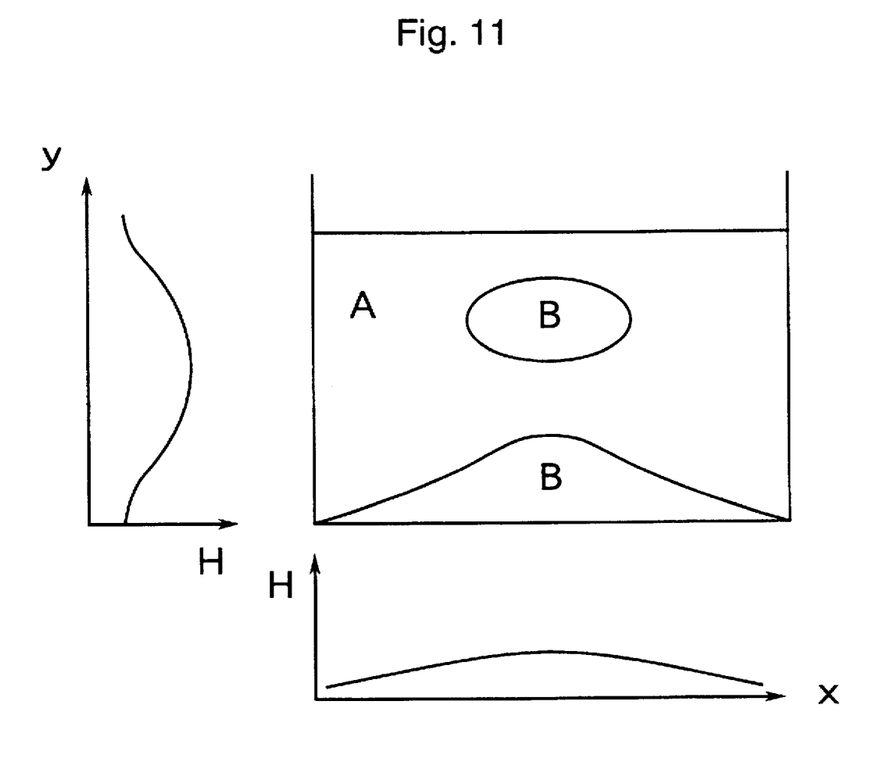

By further combining a magnetic field intensity gradient in a horizontal axis direction as previously mentioned, liquids A and B can be changed into a more complex shape. In FIG. 11, for example, by applying a magnetic field having a gradient in both x and y directions, reversed Moses effect is exerted on liquids A and B at the lower side of the vessel and a part of liquid B is divided and surrounded by liquid A at the upper side of the vessel.

Figure 12:
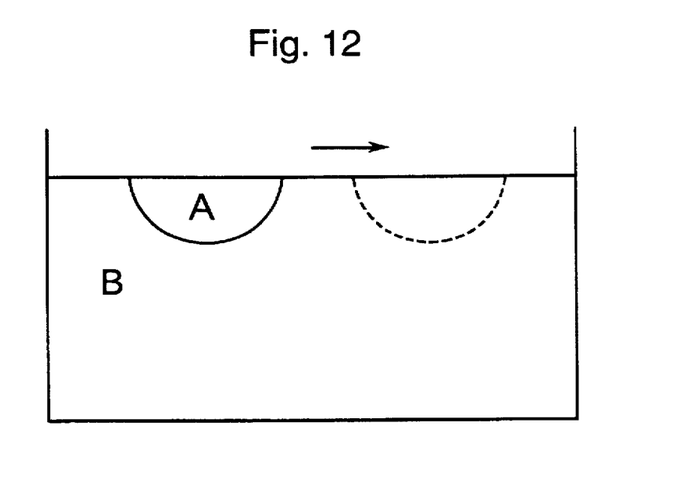

Further, when a magnetic field having a predetermined intensity distribution is applied, liquid A is surrounded by liquid B at the liquid phase surface whereby liquid A is collected as a circular pool as shown in FIG. 12 or in slit form. By moving the magnetic field intensity distribution in a horizontal axis direction in this state, liquid A can be moved to any desired position as shown by an arrow in FIG. 12.

Size control of droplet

Figure 13:
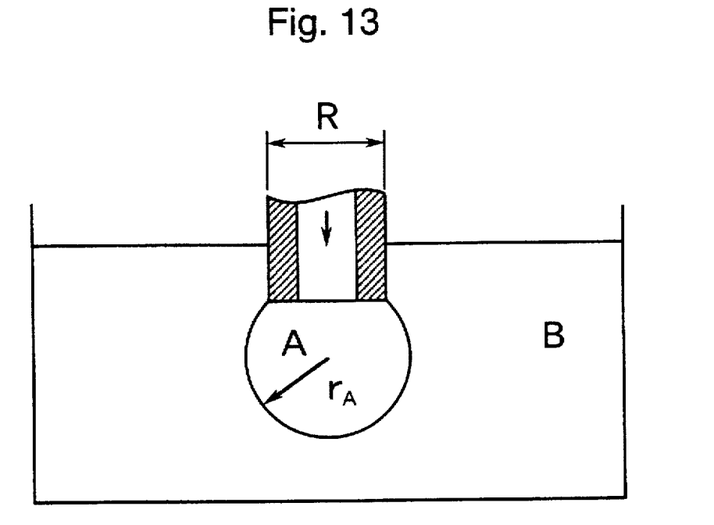

As shown in FIG. 13, liquid A is introduced into immiscible liquid B from a capillary to form a droplet of liquid A. At this point, the diameter of a liquid droplet can be controlled by applying a magnetic field.

It is assumed that liquid A is extruded into liquid B from a vertical capillary having an outer diameter R to form a droplet of liquid A and a magnetic field H having a gradient $dH/dy$ in a vertical axis direction is near the droplet. The interface between liquids A and B has a tension $\gamma_{AB}$ and liquid A wets the capillary at a contact angle $\Theta$ of $0°$. Then a force to sustain the liquid droplet is equal to the interface tension $\gamma_{AB}$ multiplied by the outer circumference $2\pi R$ of the capillary. On the other hand, a force acting downward on the liquid droplet A under a vertical magnetic field gradient is a sum of effective gravity $(\rho_A - \rho_B) g 4\pi r_A^3/3$ acting on the droplet having a radius $r_A$ plus a downward force $-(\chi_A - \chi_B) H(dH/dy)(4\pi r_A^3/3)$ by the magnetic field gradient. It can be approximated that liquid droplet falls down when the sum is greater than the supporting force based on interface tension. Then the size of the liquid droplet is approximately expressed by the following equation.

$$(4\pi r_A^3/3)\{(\rho_A-\rho_B)g-(\chi_A-\chi_B)H(dH/dy)\}=2\pi \gamma_{AB} R$$

This principle explains why the radius $r_A$ of a liquid droplet can be controlled by a magnetic field.

When droplets are formed in air, approximation $\rho_B = \chi_B = 0$ holds and a similar effect is exerted, but to a less extent. That is, the radius of a liquid droplet in a gas can be controlled by a magnetic field.

In this embodiment, a liquid droplet having a controlled diameter can be moved in a desired direction by providing a magnetic field gradient in a horizontal and/or vertical axis direction. During movement, exchange of a solute can occur between droplets of liquid A and liquid B.

Figure 14:
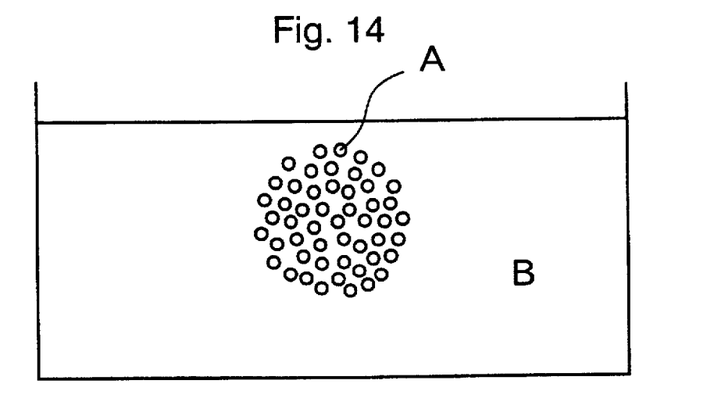

Further consideration is made on a dispersion in which droplets of liquid A are dispersed in liquid B. The size and distribution of droplets can be controlled by applying a magnetic field to the dispersion. FIG. 14 shows an embodiment wherein droplets of liquid A are concentrated near the center of the vessel. Alternatively, by moving the magnetic field, droplets can be moved or drawn in one direction and eventually out of the system.

Interface control among three or more layers

Figure 15:
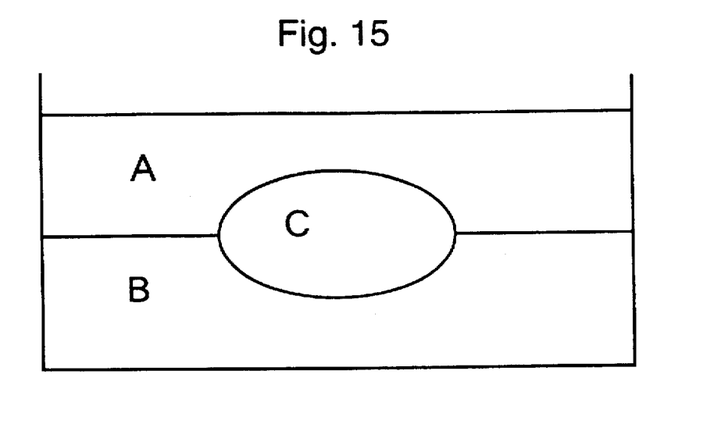

FIG. 15 shows an embodiment in which a liquid C is injected between liquids A and B (provided that liquids A, B and C are immiscible). In the absence of a magnetic field, there is formed a structure of three layers A-C-B (not shown). By applying a magnetic field, liquid C can be localized within the interface between liquids A and B. The localized mass of liquid C can be moved in a horizontal axis direction.

Figure 16:
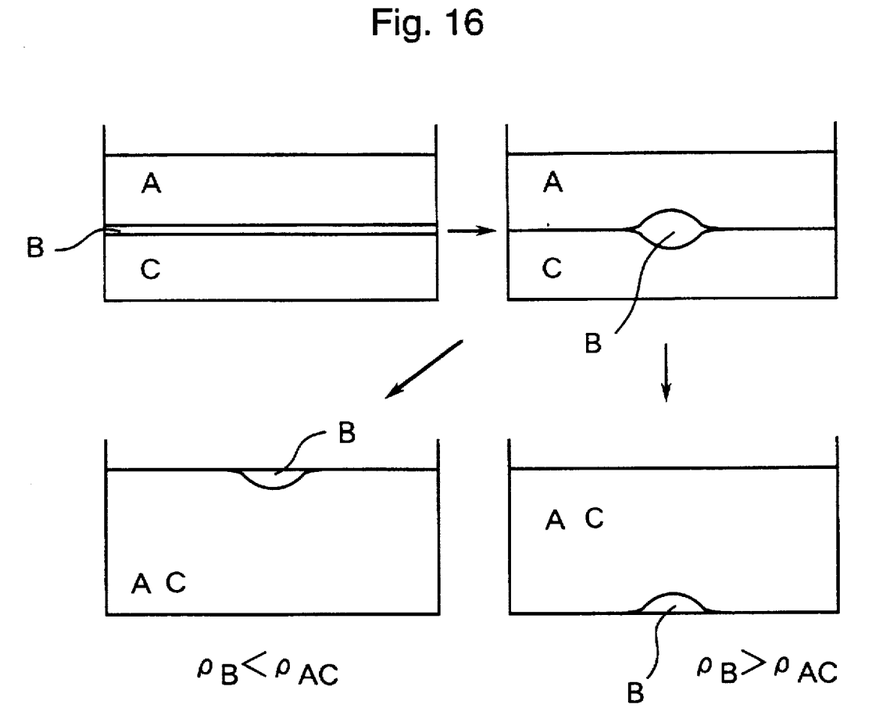

By varying with time the magnetic field gradients in vertical and horizontal axis directions or reversing them, the interface can be moved from the initial position to a different position or the respective liquids can be moved to any desired position. It is assumed, for example, that liquids A, B, and C have relationships: $\rho_A < \rho_B < \rho_C$, $\chi_A < \chi_B$, and $\chi_C < \chi_B$, and liquids A and C are miscible to form a solution AC. The initial state is a structure of three layers A-B-C as shown in FIG. 16. When a magnetic field having such a distribution that a maximum magnetic field is exerted near the center of a horizontal axis direction, liquid B is collected toward the center and surrounded by the interface between liquids A and C. If the system is allowed to stand in this condition, liquids A and C gradually intermix to form a solution AC having a density $\rho_{AC}$. Eventually separated liquid B is segregated at the liquid phase surface or vessel bottom depending on whether or not $\rho_B$ is greater than $\rho_{AC}$ while it is surrounded by solution AC. This process is irreversible.

In a variant of the embodiment of FIG. 16 wherein liquids A and C contain solutes X and Y which are chemically reactive with each other, respectively, chemical reaction can be started by applying a magnetic field to the initial structure of layers A-B-C. A magnetic field can be used to trigger chemical reaction.

Application

Growth of an organic single crystal is contemplated as one application of the above-mentioned change of the interface shape. For example, there is a demand for a protein single crystal of high purity and improved crystallinity. In general, a single crystal is grown from an organic solution of protein. In the present status, no single crystals are obtained because of disturbances in the solution due to a microscopic temperature distribution and fluctuation during crystal growth. It is reported that crystals of quality were obtained by crystal growth under weightless conditions in the Space Shuttle. Where the present invention is applied, it becomes possible that an organic solution be confined in an aqueous solution whereupon an organic single crystal be grown by overcooling. This method has the advantage that fluctuation within the organic solution is minimized since the environment for crystal growth is made more uniform. More specifically, the invention is applicable to the crystal growth from solution of giant molecules of lysozyme, vitamin C (L-ascorbic acid) and so forth.

The embodiment where one liquid is surrounded by the other liquid in a circular pool form or in a cylindrical form suggests potential application as a liquid lens. An optical switch may be implemented by utilizing light reflection, refraction and scattering at the interface. The separation of one liquid and the diameter control of a liquid droplet are applicable to the quantitative supply of chemical reagents, ice and organic compounds upon blood analysis and solution analysis.

Figure 19:
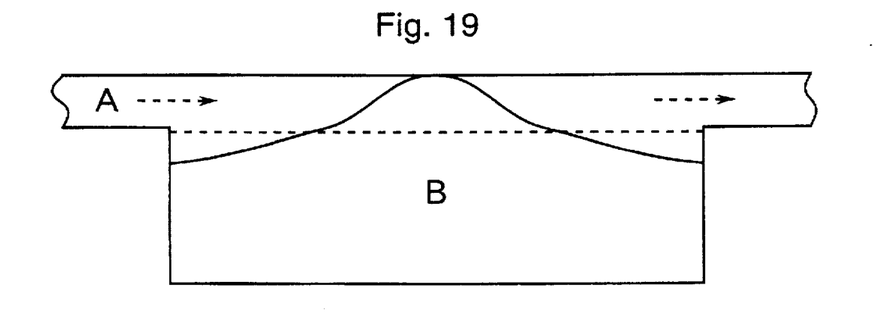

The movement and rearrangement of liquid layers are effective in the disposal of used solutions. A switch for chemical reaction can be implemented as previously described. A valve using liquids is also possible. One exemplary valve is shown in FIG. 19. A flowpath for liquid A is provided with a reservoir which is filled with valving liquid B. In the absence of a magnetic field, liquid B is in contact with liquid A to define a horizontal interface as shown by broken lines in FIG. 19 and liquid A flows through the flowpath in a direction as shown by arrows. When a magnetic field is applied such that the interface rises at the center, that is, undergoes a shape change of the reversed Moses mode as shown by a solid line in FIG. 19, the flowpath for liquid A is blocked by liquid B. In the embodiment of a liquid valve as shown in FIG. 19, an intervening layer to be described later is preferably disposed at the interface between liquids A and B because the intervening layer prevents mixing of the liquids, ensuring stable valve action. Additionally, the change of droplet distribution in a dispersion will find use in various displays and decorations.

Other liquids

With respect to the liquid, reference has been made to organic solvents, inorganic liquids, and solutions of solutes therein although the present invention is further applicable to nonmagnetic colloidal solutions.

The interface between a colloidal solution and any one of the aforementioned liquids and the interface between two colloidal solutions are equally vulnerable to various changes by a magnetic field under a set of conditions including density, volume susceptibility, and magnetic field gradient in the same manner as described above for the interface between two liquids. Since the term colloidal solution means that colloidal particles and the solvent migrate substantially together, the density and volume susceptibility correlated to the interface change under an applied magnetic field are those of the colloidal solution itself, but not those of the dispersing medium. It is only required that the colloidal solution remain stable for at least the duration when the interface is changed. The colloidal solutions include colloidal systems of molecular colloids such as protein, micelle colloids such as soap, and particulate colloids such as gold and clay.

It is noted that the viscosity of the liquid used herein is not critical as long as the viscosity allows a significant interface change. A viscosity of less than about 10 poise is generally recommended. For identical $\Delta\rho$ and $\Delta\chi$, an equal amount of interface change can be produced whether the viscosity is high or low whereas the rate of interface change increases as the viscosity becomes lower. A viscosity of less than about 1 poise is then preferred when a faster interface change is desired.

Fluids other than liquids

The invention is applicable to any nonmagnetic fluid. Powder is one typical fluid other than liquid. The interface between two powders and the interface between a powder and a liquid are equally vulnerable to various changes by a magnetic field in the same manner as described above for the interface between two liquids. The powder used herein should have high fluidity, as demonstrated by a repose angle of up to 30°. Particles of the powder should preferably have a mean particle size of less than about 1 mm and be spherical. A powder of spherical atomized particles is a preferred example. It is understood that an intervening layer to be described later is preferably disposed at the interface between two powders or a powder and a liquid in order to prevent mixing.

Solid particle dispersion

The invention is also applicable to a dispersion of a nonmagnetic solid material (solid particles) in a liquid. The interface between each solid particle and the liquid can be repositioned by applying a magnetic field to the dispersion. This means that solid particles can be moved in the dispersion. The distribution of solid particles in the liquid is changed to accomplish concentration and precipitation. The solid particle dispersion is a dispersion in which solid particles can migrate relative to the dispersing medium and encompasses some of colloidal solutions. Included in the solid particles are particles of metals, minerals, ceramics, polymers, inorganic salts, ice, wood, and microorganisms. The particles may be provided with one or more pores for density adjustment and other purposes. The size of solid particles is not critical although it is preferably about 0.1 µm to 10 mm.

Gas-Gas interface

Where two adjacent nonmagnetic gases are separated by an intervening layer to be described later as an interface, the interface can be changed by applying a magnetic field. The intervening layer is disposed for preventing intermixing of the two gases.

Intervening layer

According to the invention, the interface between various nonmagnetic fluids as mentioned above is changed by applying a magnetic field thereto. If necessary, an intervening layer is disposed along the interface between two fluids so that the first fluid is disposed adjacent to the second fluid through the intervening layer serving as the interface. The intervening layer prevents intermixing of two fluids. For example, the intervening layer enables to hold two liquids separate even though they are miscible.

Also reaction between two liquids can be controlled by disposing an intervening layer along a part of the interface between the two liquids. The provision of an intervening layer along a part of the interface encompasses the provision along the entire interface of a porous or network intervening layer and an intervening layer having selective permeability of a certain material.

The intervening layer may be a rigid body, that is, a mass which changes its position by a force acting on the fluid interface upon application of a magnetic field, but not its shape. Also acceptable is a mass which changes at least a part of its shape in response to a change of the position of the interface. The intervening layer may also be formed of expandable and flexible materials in order to make it possible to change its shape. An intervening layer with an expandable structure such as a foldable structure is also useful. The intervening layer may be secured to the vessel wall or kept afloat at the liquid-liquid interface without securing. The intervening layer may be supported afloat so that it is movable relative to the vessel wall.

Figure 20:
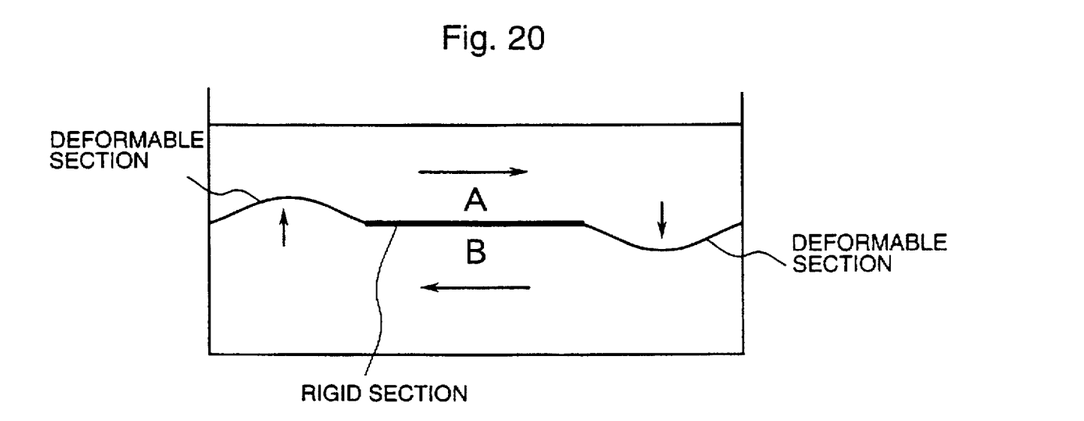

Referring to FIGS. 20 and 21, an embodiment wherein an intervening layer capable of partially changing its shape is disposed along the interface of two liquids is described. In FIG. 20, an intervening layer includes a central rigid section (shown by a thick solid line) which is secured to a vessel and lateral deformable sections which surround the rigid section and are secured to the vessel. It is assumed that the lower liquid B has a greater magnetic susceptibility $\chi$ than the upper liquid A. When a magnetic field having a relatively high intensity near the left deformable section is applied, a raising force acts on the left deformable section so as to induce a deformation of reversed Moses mode. As a consequence, the right deformable section is deformed downwardly convex whereby the upper and lower liquids flow in opposite directions of arrows.

Figure 21:
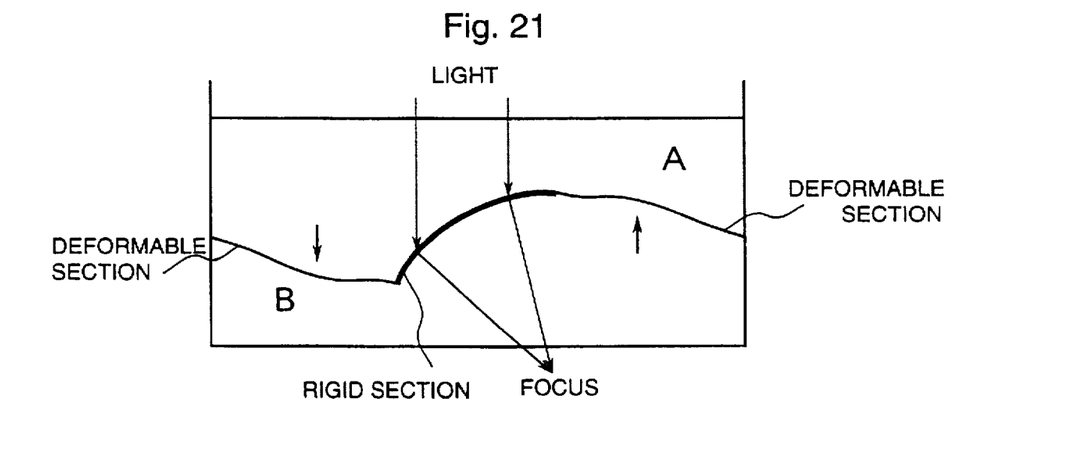

In FIG. 21, an intervening layer is the same as above except that the central rigid section is kept afloat, curved upwardly convex and transparent. In this embodiment, the lower liquid B has a higher refractive index than the upper liquid A. Then the lower liquid B whose interface is maintained curvilinear by the rigid section serves as a convex lens. Light incident on the upper liquid A passes the rigid section and the lower liquid B and converges at a focus located below the vessel bottom. When a magnetic field having a predetermined intensity gradient is applied and the intensity gradient is moved laterally in the figure, upward and downward forces act on the deformable sections of the intervening layer to change the inclination of the rigid section. As a consequence, the focus of downward incident light is moved.

The intervening layer may also be used for confining liquid droplets. More particularly, in a droplet dispersion as shown in FIG. 14, the intervening layer may be used as a cover of droplets to form so-called microcapsules.

The intervening layer may be a liquid layer. For example, liquid B in FIG. 16 serves as an intervening layer.

Any desired material may be used to form the intervening layer. A choice may be made of various polymers such as polyvinyl chloride, fluoro-resins, polyvinylidene chloride, and polyethylene and glass fibers as long as they can form a film. Ion exchange membranes and sheets of paper such as paraffin paper are also useful. Glass fiber webs are very useful when selective permeability is necessary because they are porous and easy to control a pore size. Biomembranes and similar membranes are also useful as the intervening layer.

The thickness of the intervening layer is not critical. A monomolecular film and a laminate thereof may also be used. The density of the intervening layer is not critical. Preferably the intervening layer is paramagnetic or diamagnetic so that it may not be excessively affected by a magnetic field.

Other materials

A deformable solid material may be used as at least one of two materials which are in direct contact or disposed adjacent to each other through an intervening layer as an interface. For example, the interface between two deformable solid materials and the interface between a deformable solid material and a liquid can be changed as above by applying a magnetic field although the amount of change is small as compared with the liquid-liquid interface. The deformable solid materials used herein include gels, plastic polymers such as various plastics, and resilient polymers such as rubber.

For a gas-liquid interface, a greater amount of change can be induced than is known in the art. In general, the gas phase of a gas-liquid interface is air. For an exemplary combination of oxygen as the gas phase and a diamagnetic liquid, the amount of change can be increased. This is because oxygen has a positive value and a great magnitude of $\chi$ as opposed to nitrogen occupying about 80% of air having $\chi$ approximate to zero. Inversely, if a diamagnetic gas having a negative value and a great magnitude of $\chi$ is combined with a liquid having a less magnitude of $\chi$ or a positive value of $\chi$, the interface change opposite to that obtained with oxygen can be enhanced. The amount of change can also be increased by pressurizing the gas phase to increase its density $\rho$.

EXAMPLE

Examples of the present invention are given below by way of illustration and not byway of limitation.

In the following Examples, a Pyrex® glass cell (150 cm long, 1 cm wide, 7 cm high) filled with liquids was placed in a solenoid bore of a superconducting magnet (of the lateral solenoid coil type) having a diameter of 22 cm whereby a magnetic field was applied to the liquids in the cell. The magnetic field had a distribution in a longitudinal direct of the cell and its intensity at the center could be set at any desired level in the range of 0 to 10 T. The magnetic field had as small a distribution as negligible in the directions of cell height and width. The magnetic field at the longitudinal opposite ends of the cell was regarded substantially zero. The position of the liquid phase surface (air-liquid interface) and the liquid-liquid interface was examined by taking photographs of sections (each 4 cm in lateral length) of the cell through a mirror disposed by the cell.

Example 1

A mixture of chlorobenzene/benzene (volume ratio 6.6/1) having $\rho=1.06$ g/cm$^3$ and $\chi=-8.39\times10^{-6}$ was poured onto an aqueous solution of copper sulfate having $\rho=1.07$ g/cm$^3$ and substantially zero magnetic susceptibility $\chi=0.00\times10^{-6}$ in the cell. They were used in an equal volume. They formed two layers defining an interface therebetween. A magnetic field varying its intensity from 0 to 0.9 T along the longitudinal axis and having a maximum intensity at the center was applied to the cell. The interface changed as shown in FIG. 2. The height difference between the raised top and the foot as given by $\Delta h$ was 3 cm.

Example 2

When the volume ratio of the two liquids was adjusted in Example 1, the interface changed its shape as shown in FIG. 4.

Example 3

Liquid B was chlorobenzene having $\rho=1.107$ g/cm$^3$ and $\chi=-8.65\times10^{-6}$ and liquid A was an aqueous solution of copper sulfate having $\rho=1.08$ g/cm$^3$ and $\chi=1.74\times10^{-6}$. Under an applied magnetic field of 1.9 T (maximum intensity at the center), the interface changed into a shape as shown in FIG. 5, with $\Delta h=5.7$ cm.

Example 4

When the volume of the copper sulfate solution was reduced in Example 3, the interface changed into a shape as shown in FIG. 6. When the volume of the chlorobenzene was reduced in Example 3, the interface changed into a shape as shown in FIG. 7.

Example 5

Figure 17:
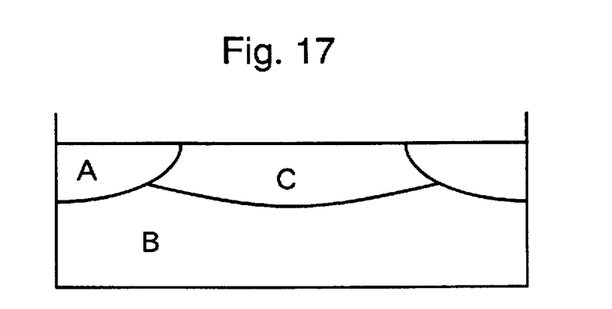
Figure 18:
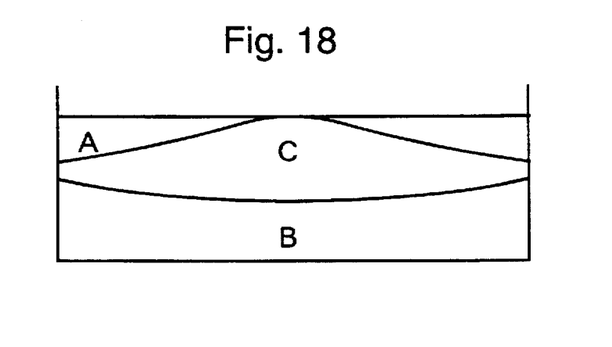

Hexane having $\rho=0.655$ g/cm$^3$ and $\chi=-7.15\times10^{-6}$ as liquid A, carbon tetrachloride having $\rho=1.60$ g/cm$^3$ and $\chi=-8.72\times10^{-6}$ as liquid B, and the copper sulfate solution of Example 3 as liquid C were poured into the cell. In the absence of a magnetic field, the liquids formed a structure of three layers A-C-B. When a magnetic field having an intensity of 8 T at the center was applied, the interfaces changed as shown in FIG. 17. This corresponded to FIG. 16 except that the volume of the upper liquid was reduced. Since hexane and carbon tetrachloride are miscible, they gradually intermixed upon direct contact of liquids A and B caused by the applied magnetic field. As the discrete liquid phases gradually merged, the arrangement shown in FIG. 17 converted into an arrangement as in FIG. 6. When the volumes of liquids A and C were increased, the arrangement shown in FIG. 18 was obtained.

Example 6

The upper layer of liquid was H$_2$O having $\rho=1.00$ g/cm$^3$ and $\chi=-9.02\times10^{-6}$ and the lower layer of liquid was an aqueous solution of MnCl$_2$ having $\rho=1.09$ g/cm$^3$ and $\chi=1.61\times10^{-4}$. A magnetic field was varied from 0 to 1 T at 6 cycles/min. whereby the interface was waved. After 10 minutes, the interface between the two liquids became indefinite.

Next the effect of an intervening layer was examined. A polyvinylidene chloride film was used as the intervening layer. The cell was first charged with an aqueous solution of MnCl$_2$. The PVDC film at its edges was attached to the cell wall at the middle of its height so that the film covered the magnesium chloride solution. The PVDC film was not extended under tension, but loosely to contain creases so that the film might not prevent the liquid-liquid interface from changing its position. H$_2$O was poured onto the film in the cell. A magnetic field was cycled as above. Although the interface was waved as above, no merging between the two liquids was observed after 10 minutes.

A magnetic field was cycled as above in the same cell where the PVDC film intervened between the magnesium chloride solution and water except that the film was kept afloat at the liquid-liquid interface without securing to the cell wall. After 10 minutes, interdiffusion of the two liquids occurred near the edges of the film, but no interdiffusion was observed near the center of the film. The interface kept waving by the magnetic field cycling.

Example 7

The cell was charged with hexane and with nitrogen thereon. A magnetic field of 8 T was applied to the cell such that a maximum magnetic field intensity was exerted at the center. The gas-liquid interface changed 30 mm in height. A similar experiment was done by charging oxygen instead of nitrogen. The gas-liquid interface changed 35 mm in height.

The effectiveness of the invention is evident from the results of the foregoing Examples.

Japanese Patent Application No. 91882/1995 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for changing the interface between two nonmagnetic liquids in contact with each other, comprising the step of applying a magnetic field to the liquids for repositioning the interface.

2. The method of claim 1 wherein the step of repositioning the interface includes reshaping or moving the interface.

3. The method of claim 1 wherein said magnetic field has a maximum intensity of up to 10 T.

4. The method of claim 3 wherein the magnetic field gradient is at least 0.001 T/cm.

5. The method of claim 1 wherein said magnetic field has a maximum intensity of up to 2 T.

6. The method of claim 1 wherein said magnetic field has a maximum intensity of at least 0.1 T.

7. The method of claim 1 wherein said magnetic field has a gradient in at least one direction.

8. The method of claim 1 wherein said two nonmagnetic liquids meet the following requirements:

$$|\Delta\chi/\Delta\rho| > |\chi_1/\rho_1| \text{ and } |\Delta\chi/\Delta\rho| > |\chi_2/\rho_2|$$

wherein one liquid has a density $\rho_1$ and a volume magnetic susceptibility $\chi_1$ and the other liquid has a density $\rho_2$ and a magnetic susceptibility $\chi_1$, and $\Delta\rho=\rho_1-\rho_2$ and $\Delta\chi=\chi_1-\chi_2$.

9. The method of claim 1 wherein the step of repositioning the interface includes curving the interface to be convex in a vertically upward or downward direction.

10. The method of claim 9 wherein the step of repositioning the interface includes surrounding one liquid by the other liquid.

11. The method of claim 9 wherein the step of repositioning the interface includes dividing one liquid into two parts by the other liquid.

12. The method of claim 9 further comprising the step of moving one liquid relative to the other liquid by moving the magnetic field.

13. The method of claim 1 wherein the two liquids form upper and lower layers defining the interface therebetween, and wherein the step of repositioning the interface comprises inverting the two liquids with respect to one another.

14. The method of claim 1 wherein one liquid is present as a droplet having a diameter in the other liquid, and the step of repositioning the interface includes controlling the diameter of the droplet.

15. The method of claim 1 wherein one liquid is present as droplets in the other liquid, and the step of repositioning the interface includes moving the droplets.

16. The method of claim 1 wherein a third liquid is disposed between the two liquids in a three layer arrangement, and the step of repositioning the interface includes discretely localizing the third liquid at the interface between the two liquids.

17. The method of claim 1 wherein the two liquids which are miscible with each other are separated by the third liquid in the three layer arrangement, and the magnetic field applied acts to bring the two liquids in mutual contact to form a solution.

18. The method of claim 1 wherein a layer intervenes between the first and second liquids along the interface.

19. The method of claim 18 wherein at least part of the intervening layer changes its shape as the interface is repositioned.

20. The method of claim 18 wherein said intervening layer is a film of a polymer or glass fibers.

21. A material interface changing apparatus comprising
a vessel charged with two nonmagnetic liquids which are in contact with each other to define an interface therebetween and
means for applying a magnetic field to the liquids for repositioning the interface.

* * * * *

UNITED STATES PATENT AND TRADEMARK OFFICE
CERTIFICATE OF CORRECTION

PATENT NO.   : 5,733,458
DATED        : March 31, 1998
INVENTOR(S)  : Koichi KITAZAWA, et al.

It is certified that error appears in the above-identified patent and that said Letters Patent is hereby corrected as shown below:

On the title page, item [30] is missing, it should be:

--[30]     Foreign Application Priority Data
     Mar. 24, 1995   [JP]   Japan   .........   7-91882--

Signed and Sealed this

Twenty-third Day of June, 1998

Attest:

BRUCE LEHMAN

*Attesting Officer*          *Commissioner of Patents and Trademarks*

UNITED STATES PATENT AND TRADEMARK OFFICE
CERTIFICATE OF CORRECTION

PATENT NO. : 5,733,458
DATED : March 31, 1998
INVENTOR(S) : Koichi KITAZAWA et al.

It is certified that error appears in the above-identified patent and that said Letters Patent is hereby corrected as shown below:

Column 13, line 50, "$|\Delta\chi/\Delta\rho|>|\chi_1/\rho_1|$ and $\Delta\chi/\Delta\rho|>|\chi_2/\rho_2|$" should read --$|\Delta\chi/\Delta\rho|>|\chi_1/\rho_1|$ and $|\Delta\chi/\Delta\rho|>|\chi_2/\rho_2|$--.

Column 14, line 3, "magnetic susceptibility $\chi_1$, and $\Delta\rho=\rho_1-\rho_2$ and $\Delta\chi=\chi_{1-\chi2}$" should read --magnetic susceptibility $\chi_2$, and $\Delta\rho=\rho_1-\rho_2$ and $\Delta\chi=\chi_1-\chi_2$--.

Signed and Sealed this

First Day of September, 1998

*Attest:*

BRUCE LEHMAN

*Attesting Officer*   Commissioner of Patents and Trademarks